(12) United States Patent
Lopez et al.

(10) Patent No.: US 8,440,297 B2
(45) Date of Patent: May 14, 2013

(54) POLYMER ORGANOCLAY COMPOSITES

(75) Inventors: Leonardo C. Lopez, Midland, MI (US);
Scott T. Matteucci, Midland, MI (US);
Sarada P. Namhata, Midland, MI (US)

(73) Assignee: Dow Global Technologies LLC

( * ) Notice: Subject to any disclaimer, the term of this patent is extended or adjusted under 35 U.S.C. 154(b) by 701 days.

(21) Appl. No.: 12/623,308

(22) Filed: Nov. 20, 2009

(65) Prior Publication Data

US 2010/0129591 A1    May 27, 2010

Related U.S. Application Data

(60) Provisional application No. 61/117,813, filed on Nov. 25, 2008.

(51) Int. Cl.
*D02G 3/00* (2006.01)
*B32B 5/16* (2006.01)
*B32B 27/12* (2006.01)

(52) U.S. Cl.
USPC ........... 428/372; 428/364; 428/365; 428/323; 442/394

(58) Field of Classification Search ........... 524/445–791
See application file for complete search history.

(56) References Cited

U.S. PATENT DOCUMENTS

| | | | |
|---|---|---|---|
| 4,739,007 A | 4/1988 | Okada et al. | |
| 5,514,734 A | 5/1996 | Maxfield et al. | |
| 5,698,624 A | 12/1997 | Beall et al. | |
| 5,962,553 A | 10/1999 | Ellsworth | |
| 6,034,163 A | 3/2000 | Barbee et al. | |
| 6,156,835 A | 12/2000 | Anderson et al. | |
| 6,172,167 B1 | 1/2001 | Stapert et al. | |
| 8,080,617 B2 | 12/2011 | Broos et al. | |
| 8,206,484 B2 | 6/2012 | Claasen et al. | |
| 2007/0299155 A1* | 12/2007 | Carpenter et al. | 523/105 |
| 2008/0214743 A1 | 9/2008 | Broos et al. | |
| 2008/0241525 A1 | 10/2008 | Kasahara | |
| 2010/0003830 A1 | 1/2010 | Itoh | |
| 2010/0004087 A1 | 1/2010 | Minegishi et al. | |
| 2010/0004088 A1 | 1/2010 | Wenthen | |
| 2010/0004129 A1 | 1/2010 | Ahrens et al. | |
| 2010/0004180 A1 | 1/2010 | Wolff et al. | |
| 2010/0004185 A1 | 1/2010 | Kannar et al. | |
| 2010/0006464 A1 | 1/2010 | Flynn | |
| 2010/0009397 A1 | 1/2010 | Sebti et al. | |

(Continued)

FOREIGN PATENT DOCUMENTS

| WO | 2007030791 | 3/2007 |
|---|---|---|
| WO | 2007099397 | 9/2007 |

(Continued)

OTHER PUBLICATIONS

Cho et al., "Nylon 6 Nanocomposites by melt compounding", Polymer, 2001, pp. 1083-1094, vol. 42(3), Elsevier Science Ltd.

(Continued)

*Primary Examiner* — Jennifer Chriss
*Assistant Examiner* — Ricardo E Lopez

(57) ABSTRACT

The instant invention generally provides polymer organoclay composite comprising a molecularly self-assembling material and an organoclay, and a process of making and an article comprising the polymer organoclay composite. The instant invention also generally provides a fiber comprising the polymer organoclay composite, and a process of fabricating and an article comprising the fiber.

18 Claims, 8 Drawing Sheets

U.S. PATENT DOCUMENTS

| | | |
|---|---|---|
| 2010/0011983 A1 | 1/2010 | Chalfon et al. |
| 2010/0012743 A1 | 1/2010 | Nakazono et al. |
| 2010/0012959 A1 | 1/2010 | Wilm et al. |
| 2010/0012964 A1 | 1/2010 | Copic et al. |
| 2010/0013747 A1 | 1/2010 | Honda |
| 2010/0020049 A1 | 1/2010 | Yim et al. |
| 2010/0041292 A1 | 2/2010 | Kim et al. |
| 2010/0041857 A1 | 2/2010 | Harris et al. |
| 2010/0126341 A1 | 5/2010 | Matteucci et al. |
| 2010/0126342 A1 | 5/2010 | Lopez et al. |
| 2010/0127434 A1 | 5/2010 | Broos et al. |
| 2010/0129634 A1 | 5/2010 | Lopez et al. |
| 2010/0129641 A1 | 5/2010 | Lopez et al. |
| 2010/0137478 A1 | 6/2010 | White et al. |

FOREIGN PATENT DOCUMENTS

| | | |
|---|---|---|
| WO | 2008002868 | 1/2008 |
| WO | 2008002869 | 1/2008 |
| WO | 2008101051 | 8/2008 |
| WO | 2008112833 | 9/2008 |
| WO | 2008150970 | 12/2008 |
| WO | 2009134824 | 11/2009 |

OTHER PUBLICATIONS

Ciferri, Alberto, "Supramolecular Polymers", Second Edition, 2005, pp. 157-158, CRC Press.

Corbin et al., "Chapter 6 Hydrogen-Bonded Supramolecular Polymers: Linear and Network Polymers and Self-Assembling Discotic Polymers", Supramolecular Polymers, 2nd edition, CRC Press, 2005, pp. 153-182.

Fornes et al., "Nylon 6 Nanocomposites: the effect of matrix molecular weight", Polymer, 2001, pp. 9929-9940, vol. 42(25), Elsevier Science Ltd.

Koevoets et al., "Molecular Recognition in a Thermoplastic Elastomer", Journal of the American Chemical Society, 2005, pp. 2999-3003, vol. 127.

Krook et al., "Barrier and Mechanical Properties of Injection Molded Montmorillonite/Polyesteramide Nanocomposites", Polymer Engineering and Science, 2005, pp. 135-141, vol. 45(1), Wiley InterScience.

Lips et al., "Incorporation of different crystallizable amide blocks in segmented poly(ester amide)s", Polymer, 2005, pp. 7834-7842, vol. 46, Elsevier Ltd.

Lips et al., "Synthesis and characterization of poly(ester amide)s containing crystallizable amide segments", Polymer, 2005, pp. 7823-7833, vol. 46, Elsevier Ltd.

\* cited by examiner

POLYMER ORGANOCLAY COMPOSITES

CROSS-REFERENCE TO RELATED APPLICATION(S)

This application claims benefit of priority from U.S. Provisional Patent Application No. 61/117,813, filed Nov. 25, 2008, which application is incorporated by reference herein in its entirety.

The present invention is in the field of polymer organoclay composites.

BACKGROUND OF THE INVENTION

There is a need in the polymer art for new polymer organoclay composites, and processes of making and articles comprising the polymer organoclay composites.

SUMMARY OF THE INVENTION

In a first embodiment, the instant invention is a polymer organoclay composite comprising a molecularly self-assembling (MSA) material and an organoclay dispersed in the MSA material, wherein the organoclay comprises a cation exchanging layered material and organic cations, the cation exchanging layered material having a cation exchanging capacity that is at least 1 mole percent (mol %) exchanged with the organic cations, and the organoclay comprising from 1 weight percent (wt %) to 70 wt % of the polymer organoclay composite based on total weight of the polymer organoclay composite.

In a second embodiment, the instant invention is a process for making the polymer organoclay composite of the first embodiment, the process comprising the step of: mixing a desired amount of the organoclay in either a melt comprising the MSA material or a solution comprising a solvent and the MSA material to produce a melt of the polymer organoclay composite of the first embodiment. Preferably the process employs the melt comprising the MSA material.

In a third embodiment, the instant invention is an article comprising the polymer organoclay composite of the first embodiment. Preferably, the article comprises a water barrier or oxygen barrier material or molded article (e.g., a wall having a length and width or having a diameter that is at least 100 times thickness of the wall).

In a fourth embodiment, the instant invention is a polymer organoclay composite fiber comprising the polymer organoclay composite of the first embodiment, the polymer organoclay composite fiber having an average diameter and the organoclay having at least one dimension that is less than 10% of the average diameter of polymer organoclay composite fiber.

In a fifth embodiment, the instant invention is a process for fabricating the polymer organoclay composite fiber of the fourth embodiment, the process comprising the step of: melt spin extruding a mixture comprising the organoclay and a first melt comprising the MSA material under fiber forming conditions to give the polymer organoclay composite fiber of the fourth embodiment.

In a sixth embodiment, the instant invention is an article comprising the polymer organoclay composite fiber of the fourth embodiment. In some embodiments, the article comprises a porous filter medium (e.g., for filtering air, gasses, or liquids), wound dressing (e.g., bandage), textile (e.g., fabric), carpeting, structure reinforcing material, antistatic medium, conductive medium (electrical or magnetic), or catalyst medium. In other embodiments, the article comprises packaging, blow molded articles, thermal insulation, electrical insulation, or an electrical conductor. In still other embodiments, the article comprises a medical gown, medical tissue scaffold, cosmetic applicator, sound insulation, barrier material, diaper coverstock, adult incontinence pants, training pants, underpad, feminine hygiene pad, wiping cloth, durable paper, fabric softener, home furnishing, floor covering backing, geotextile, apparel, apparel interfacing, apparel lining, shoe, industrial garment, protective garments and fabrics, agricultural fabric, automotive fabric, automotive component (e.g., internal door panel), coating substrate, laminating substrate, leather, or electronic component.

The polymer organoclay composite of the first embodiment is melt processable even at high organoclay concentrations (e.g., greater than or equal to 50 wt % organoclay).

Additional embodiments of the present invention are illustrated in the accompanying drawings and are described in the following detailed description and claims.

DETAILED DESCRIPTION OF THE INVENTION

Figure 1A:
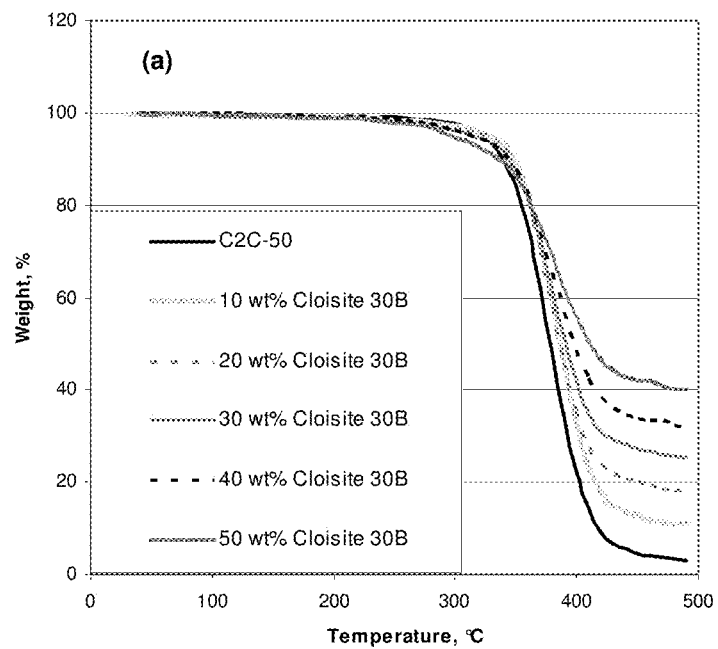
FIG. 1(a) graphically depicts thermogravimetric analysis (TGA) results for Comparative Example 1 and Examples 3 to 7.

As used herein, "a," "an," "the," "at least one," and "one or more" are used interchangeably. In any embodiment of the instant invention described herein, the open-ended terms "comprising," "comprises," and the like (which are synonymous with "including," "having," and "characterized by") may be replaced by the respective partially closed phrases "consisting essentially of," "consists essentially of," and the like or the respective closed phrases "consisting of," "consists of," and the like. In the present application, when referring to a preceding list of elements (e.g., ingredients), the phrases "mixture thereof," "combination thereof," and the like mean any two or more, including all, of the listed elements.

For purposes of United States patent practice and other patent practices allowing incorporation of subject matter by reference, the entire contents—unless otherwise indicated—of each U.S. patent, U.S. patent application, U.S. patent application publication, PCT international patent application and WO publication equivalent thereof, referenced in the instant Detailed Description of the Invention are hereby incorporated by reference. In an event where there is a conflict between what is written in the present specification and what is written in a patent, patent application, or patent application publication, or a portion thereof that is incorporated by reference, what is written in the present specification controls. The present specification may be subsequently amended to incorporate by reference subject matter from a U.S. patent or U.S. patent application publication, or portion thereof, instead of from a PCT international patent application or WO publication equivalent, or portion thereof, originally referenced herein, provided that no new matter is added and the U.S. patent or U.S. patent application publication claims priority directly from the PCT international patent application.

In the present application, headings (e.g., "Definitions") are used for convenience and are not meant, and should not be used, to limit scope of the present disclosure in any way.

In the present application, any lower limit of a range of numbers, or any preferred lower limit of the range, may be combined with any upper limit of the range, or any preferred upper limit of the range, to define a preferred embodiment of the range. Each range of numbers includes all numbers subsumed within that range (e.g., the range from about 1 to about 5 includes, for example, 1, 1.5, 2, 2.75, 3, 3.80, 4, and 5).

In an event where there is a conflict between a unit value that is recited without parentheses, e.g., 2 inches, and a corresponding unit value that is parenthetically recited, e.g., (5 centimeters), the unit value recited without parentheses controls.

DEFINITIONS

As used herein, the terms "cation exchange capacity" and "cation exchanging capacity" of a cation exchanging layered material are synonymous and represent an amount of a set of exchangeable cations and describes a capability to replace one set of exchangeable cations (typically a capability to replace inorganic ions such as sodium cation ($Na^+$), calcium cation ($Ca^{+2}$) or hydrogen cation ($H^+$)) with another set of cations (either inorganic or, preferably, organic). Organic cations are derived from an organic cation exchange material, which is described elsewhere herein. The term "exchangeable cations" means monovalent cations, polyvalent cations, or a mixture thereof, each cation having a formal positive charge.

The term "cation exchanging layered material" means a substance derived from a swellable (using the swelling liquid useful in the present invention) inorganic solid (natural or synthetic) comprised of negatively-charged layers (also known as sheets or platelets) and having a cation exchanging capacity (which is substantially exchangeable in a swollen state). Cations balance (i.e., neutralize) the negative charge of the cation exchanging layered material. The inorganic solid preferably is a swellable, natural or synthetic inorganic clay. The inorganic clay preferably comprises layers of negatively charged material and inorganic cations.

The term "desired amount" means a weight sufficient for producing an intended composite.

The term "dispersed" means distributed substantially evenly throughout a medium (e.g., a polymer).

The term "exfoliatably contacting" and phrase "under exfoliating conditions" are essentially synonymous and mean mixing an organoclay capable of being exfoliated in a medium under conditions facilitating mechanical separation (e.g., via shear) of at least some layers of the organoclay to produce a mixture, suspension, or distribution of an exfoliated organoclay, wherein the organoclay is distributed substantially evenly throughout the medium (e.g., a polymer).

The term "exfoliated" means, for present purposes, that the cation exchanging layered material is partially or fully delaminated such that at least 50% of particles thereof have at least one dimension that is less than 100 nm. Preferably, the cation exchanging layered material is delaminated into first components, each independently having one, two, three, four, five, six, seven, eight, nine, or ten layers of cation exchanging layered material and, optionally, second components, each independently having more than ten layers of cation exchanging layered material, the volume percent of all of the first components being greater than the volume percent of all of the second components upon examination by transmission electron microscopy of a representative sample of polymer composite. That is, the cation exchanging layered material need not be completely exfoliated into one-layer components, but may exist as a mixture of components having varying numbers of layers as described. In some embodiments, the cation exchanging layered material is delaminated into third components, each independently having one, two, three, four, or five layers and, optionally, fourth components, each independently having more than five layers of cation exchanging layered material, the volume percent of all of the third components being greater than the volume percent of all of the fourth components upon examination by transmission electron microscopy of a representative sample of the polymer composite.

The term "hydrocarbyl" as used in describing an organic cation means a univalent hydrocarbon radical of from 1 to 100 carbon atoms, wherein the radical is formally formed by removing a hydrogen atom from a hydrocarbon. Preferably, each hydrocarbon radical independently is unsubstituted or substituted, aromatic or non-aromatic, saturated or unsaturated, straight chain or branched chain, cyclic (including mono- and poly-cyclic, fused and non-fused polycyclic) or acyclic, or a combination of two or more thereof. Preferably, each hydrocarbyl independently is a $(C_1-C_{100})$alkyl, $(C_3-C_{100})$cycloalkyl, or $(C_3-C_{50})$cycloalkyl-$(C_1-C_{50})$alkylene. The term "$(C_1-C_{100})$alkyl" means a saturated straight or branched hydrocarbon radical of from 1 to 100 carbon atoms. The term "$(C_1-C_{50})$alkylene" means a saturated straight or branched chain diradical of from 1 to 50 carbon atoms. The term "$(C_3-C_{100})$cycloalkyl" means a saturated cyclic hydrocarbon radical of from 3 to 100 carbon atoms. Substituted hydrocarbyl contains 1 or more, preferably from 1 to 5, substituents, wherein each substituent independently is phenyl, benzyl, hydroxy (—OH) or carboxy (—$CO_2H$), or a salt thereof (e.g., —$CO_2Na$). More preferably, each hydrocarbyl comprises from 1 to 40 carbon atoms, still more preferably from 1 to 20 carbon atoms. When there are two or more hydrocarbyl groups, preferably at least one hydrocarbyl comprises 10 or more carbon atoms.

The term "organic cation material" means a substance comprising organic cations and their associated counter anions. The term "organic cations" means a cation that comprises at least one hydrocarbyl radical covalently bonded to a cation functionality. The organic cations may be the same or different. The cation functionality preferably comprises a nitrogen, phosphorous, sulfur, oxygen, or arsenic atom having a formal charge of +1. More preferably, the cation functionality comprises a nitrogen, phosphorous, or sulfur atom, still more preferably a nitrogen atom, having a formal charge of +1.

The term "organoclay" means a substance comprising organic cations, a cation exchanging layered material having a cation exchanging capacity that is at least 1 mol %, preferably at least 10 mol % exchanged, and, depending on the mole percent exchanged, inorganic cations, wherein the cation exchanging layered material and, preferably the inorganic cations, are derived from a natural or synthetic inorganic clay. The organic cations are derived from the organic cation material. In some embodiments, the organoclay useful in the present invention is prepared from the inorganic clay by exchanging less than all, all, or more than all of inorganic cations of the inorganic clay for organic cations. That is, the inorganic clay has less than all, all, or more than all of its cation exchanging capacity exchanged for organic cations.

The "polymer organoclay composite" is, in aggregate, neutral. Counter anions for neutralizing cations such as, for example, the organic cations of the polymer organoclay composite, can be contained in any component of, or sourced from any precursor material (e.g., organoclay) to, the polymer organoclay composite, including in or from the MSA material (e.g., in a form of a —COO⁻ group).

The term "$T_g$" means glass transition temperature as determined by differential scanning calorimetry (DSC).

The term "$T_m$" means melting temperature (i.e., melting temperature) as determined by DSC. If a MSA material has one or more $T_m$, preferably at least one $T_m$ is 25° C. or higher.

For purposes herein, determine $T_g$ and $T_m$ according to the following procedure. Load a sample weighing between 5 milligrams (mg) and 10 mg into an aluminum hermetic DSC pan. Sequentially expose the sample to a first heating scan, holding step, cooling step, and a second heating scan. Particularly, in the first heating scan, heat the sample to 200° C. at a heating rate of 10° C. per minute. Hold the sample at 200° C. for 1 minute, and then cool the sample to −80° C. at a cooling rate of 10° C. per minute. Then in the second heating scan, heat the cooled sample to 200° C. at a heating rate of 10° C. per minute. Determine thermal events such as $T_g$ and $T_m$ from the second heating scan.

The term "viscosity" means zero shear viscosity unless specified otherwise.

Unless otherwise indicated, each "weight percent" of a component of a multicomponent material is determined by dividing weight of the component by total weight of the multicomponent material, and multiplying the result by 100.

Organoclays

In some embodiments, the cation exchanging capacity of the organoclay is less than 100 mol % exchanged (e.g., 99 mol % exchanged or less) with the organic cations, that is the organoclay has unused cation exchanging capacity, i.e., the inorganic cations are less than fully exchanged with the organic cations such that the organoclay also contains unexchanged inorganic cations. In such embodiments, preferably the cation exchanging capacity is at least 20 mol % exchanged, more preferably at least 30 mol % exchanged, still more preferably at least 40 mol % exchanged, and even more preferably at least 50 mol % exchanged with the organic cations and, the remainder of the cation exchanging capacity being the unexchanged inorganic cations. In other embodiments, the cation exchanging capacity of the organoclay is 100 mol % exchanged with the organic cations. In such embodiments, preferably the organoclay lacks inorganic cations.

In some embodiments of the present invention, the cation exchange capacity of an inorganic clay is measured in order to determine the number of moles of organic cation exchange material to add thereto for preparation of an organoclay useful in the present invention. For example, the cation exchange capacity of the inorganic clay can be measured by several methods, most of which perform an actual exchange reaction and analyze the product for the presence of each of the exchanging ions. Thus, the stoichiometry of exchange can be determined on a mole percent (mol %) basis. Alternatively, the cation exchange capacity of commercially available inorganic clays may be provided by their commercial suppliers.

While the particular method used to measure the cation exchange capacity of the inorganic clay is not important to the present invention, preferably, the cation exchange capacity of the inorganic clay may be measured using the procedure described on page 155 of *Composition and Properties of Oil Well Drilling Fluids*, $4^{th}$ edition, George R. Gray and H. C. H. Darley, 1980, Gulf Publish Company, Houston, Tex., USA. One method of Gray and Darley involves leaching a first sample of an inorganic clay with excess of a suitable salt such as, for example, ammonium acetate to provide a first filtrate and leaching a second sample of the inorganic clay with water to provide a second filtrate. Separately analyzing the first and second filtrates for common exchange cations by conventional means provides a milliequivalents (mEQ, defined below) of each species of cation adsorbed on the clay and, thus, total mEQ, i.e., cation exchange capacity (CEC), of all species of cations. The term "milliequivalents" (mEQ) equals millimole equivalents of cation exchange capacity; for example, 125 mEQ means 0.125 moles of cation exchange capacity.

The inorganic clay (i.e., inorganic cation exchanging layered material) useful in the present invention (e.g., a silicate clay or 2:1 silicate clay in its natural state or washed with purified water) preferably has a negative charge on its surface of at least 20 mEQ, more preferably at least 50 mEQ, and preferably 200 mEQ or less, more preferably 150 mEQ or less, still more preferably 125 mEQ or less, per 100 grams (g) of the material.

Examples of preferred inorganic clays are layered silicates (such as montmorillonite and kenyaite), layered 2:1 silicates (such as natural and synthetic smectites, hormites, vermiculites, illites, micas, and chlorites), and sepiolites. Preferably, the cation exchanging layered material is derived from a montmorillonite, mica, fluoromica, sepiolite, nontronite, bentonite, kaolinite, beidellite, volkonskonite, hectorite, fluorohectorite, saponite, sauconite, stevensite, halloysite, attapulgite, medmontite, kenyaite, or vermiculite, or a mixture of two or more thereof. In some embodiments, the cation exchanging layered material is not derived from magadiite or a synthetic hydrous magnesium silicate clay (e.g., LAPONITE®, Rockwood Additives Limited, Cheshire, England). In some embodiments, the cation exchanging layered material is derived from fluoromica (e.g., a synthetic fluoromica such as, for example, SOMASIF ME-100 MEE-100, Co-Op Chemicals, Japan), montmorillonite (e.g., CLOISITE™ Na⁺, Southern Clay Products, Inc., USA), or sepiolite.

In some embodiments, the organic cations are onium ions. Examples of onium organic cations are phosphonium, arsonium, sulfonium, oxonium, imidazolium, benzimidazolium, imidazolinium, quaternary ammonium (e.g., $R^1R^2R^3R^4N^+$ wherein each of $R^1$, $R^2$, $R^3$, and $R^4$ independently is a hydrocarbyl of from 1 to 100 carbon atoms, and preferably at least one of $R^1$, $R^2$, $R^3$, and $R^4$ contains 10 or more carbon atoms), protonated amine (e.g., $N(H)_4^+$, $R^1N(H)_3^+$, $R^1R^2N(H)_2^+$ and $R^1R^2R^3N(H)^+$), protonated amine oxide, protonated betaine, pyridinium, anilinium, pyrrolium, piperidinium, pyrazolium, quinolinium, isoqunolinium, indolium, oxazolium, benzoxazolium, and quinuclidinium, and a combination of two or more thereof. Preferably, the organic cations are quaternary ammoniums, protonated amines, or a mixture thereof. More preferably, the organic cations are quaternary ammoniums.

A typical example of an onium organic cation is a quaternary ammonium compound of the formula $R^1R^2R^3R^4N^+$. Other examples of organic cations are the onium compounds, amphoteric surface-active agents, choline compounds, and organosilane compounds described in U.S. Pat. No. 6,156, 835, at column 6, line 32, to column 7, line 11; and the organophosphonium compounds described in U.S. Pat. No. 5,962,553, at column 3, lines 29 to 44, and preparations of organoclays therewith described at column 3, line 45, to column 4, line 23; wherefrom only column 6, line 32, to column 7, line 11, of U.S. Pat. No. 6,156,835 and only column 3, line 29, to column 4, line 23, of U.S. Pat. No. 5,962,553 are incorporated herein by reference. In some embodiments, the organic cation consists essentially of a diethoxy methyl ($C_1$-$C_{100}$)alkyl quaternary ammonium wherein the ($C_1$-$C_{100}$) alkyl group has from 12 to 18 carbon atoms. In other embodiments, the organic cation is a dimethyl di($C_1$-$C_{100}$)alkyl) quaternary ammonium.

In some embodiments, the organic cation material comprises a mixture of two or more different organic cations such as, for example, a mixture of two or more different quaternary ammonium cations, a mixture of quaternary ammonium cations and protonated amines, and a mixture of quaternary ammonium cations and alkoxy silyl alkyl amines. The presence of free amino groups (i.e., formally neutral amino nitrogen atoms) in the quaternary ammonium cation is also contemplated. Protonated amines may be prepared, for example and without limitation thereto, by the contact of the cation exchanging layered material with an acid followed by contact of the cation exchanging layered material with ammonia ($NH_3$) or an organic amine (e.g., $R^1N(H)_2$, $R^1R^2NH$, and $R^1R^2R^3N$) to protonate the ammonia or an organic amine Molecularly Self-Assembling Material As used herein a MSA material means an oligomer or polymer that effectively forms larger associated or assembled oligomers and/or polymers through the physical intermolecular associations of chemical functional groups. Without wishing to be bound by theory, it is believed that the intermolecular associations do not increase the molecular weight (Mn-Number Average molecular weight) or chain length of the self-assembling material and covalent bonds between said materials do not form. This combining or assembling occurs spontaneously upon a triggering event such as cooling to form the larger associated or assembled oligomer or polymer structures. Examples of other triggering events are the shear-induced crystallizing of, and contacting a nucleating agent to, a molecularly self-assembling material. Accordingly, in preferred embodiments MSAs exhibit mechanical properties similar to some higher molecular weight synthetic polymers and viscosities like very low molecular weight compounds. MSA organization (self-assembly) is caused by non-covalent bonding interactions, often directional, between molecular functional groups or moieties located on individual molecular (i.e. oligomer or polymer) repeat units (e.g. hydrogen-bonded arrays). Non-covalent bonding interactions include: electrostatic interactions (ion-ion, ion-dipole or dipole-dipole), coordinative metal-ligand bonding, hydrogen bonding, π-π-structure stacking interactions, donor-acceptor, and/or van der Waals forces and can occur intra- and intermolecularly to impart structural order. One preferred mode of self-assembly is hydrogen-bonding and this non-covalent bonding interactions is defined by a mathematical "Association constant", K(assoc) constant describing the relative energetic interaction strength of a chemical complex or group of complexes having multiple hydrogen bonds. Such complexes give rise to the higher-ordered structures in a mass of MSA materials. A description of self assembling multiple H-bonding arrays can be found in "Supramolecular Polymers", Alberto Ciferri Ed., 2nd Edition, pages (pp) 157-158. A "hydrogen bonding array" is a purposely synthesized set (or group) of chemical moieties (e.g. carbonyl, amine, amide, hydroxyl. etc.) covalently bonded on repeating structures or units to prepare a self assembling molecule so that the individual chemical moieties preferably form self assembling donor-acceptor pairs with other donors and acceptors on the same, or different, molecule. A "hydrogen bonded complex" is a chemical complex formed between hydrogen bonding arrays. Hydrogen bonded arrays can have association constants K (assoc) between $10^2$ and $10^9$ $M^{-1}$ (reciprocal molarities), generally greater than $10^3$ $M^{-1}$. In preferred embodiments, the arrays are chemically the same or different and form complexes.

Accordingly, the molecularly self-assembling materials (MSA) presently include: molecularly self-assembling polyesteramides, copolyesteramide, copolyetheramide, copolyetherester-amide, copolyetherester-urethane, copolyether-urethane, copolyester-urethane, copolyester-urea, copolyetherester-urea and their mixtures. Preferred MSA include copolyesteramide, copolyether-amide, copolyester-urethane, and copolyether-urethanes. The MSA preferably has number average molecular weights, $MW_n$ (interchangeably referred to as $M_n$) (as is preferably determined by NMR spectroscopy) of 2000 grams per mole or more, more preferably at least about 3000 g/mol, and even more preferably at least about 5000 g/mol. The MSA preferably has $MW_n$ 50,000 g/mol or less, more preferably about 20,000 g/mol or less, yet more preferably about 15,000 g/mol or less, and even more preferably about 12,000 g/mol or less. The MSA material preferably comprises molecularly self-assembling repeat units, more preferably comprising (multiple) hydrogen bonding arrays, wherein the arrays have an association constant K (assoc) preferably from $10^2$ to $10^9$ reciprocal molarity ($M^{-1}$) and still more preferably greater than $10^3$ $M^{-1}$; association of multiple-hydrogen-bonding arrays comprising donor-acceptor hydrogen bonding moieties is the preferred mode of self assembly. The multiple H-bonding arrays preferably comprise an average of 2 to 8, more preferably 4-6, and still more preferably at least 4 donor-acceptor hydrogen bonding moieties per molecularly self-assembling unit. Molecularly self-assembling units in preferred MSA materials include bis-amide groups, and bis-urethane group repeat units and their higher oligomers.

Preferred self-assembling units in the MSA material useful in the present invention are bis-amides, bis-urethanes and bis-urea units or their higher oligomers. A more preferred self-assembling unit comprises a poly(ester-amide), poly (ether-amide), poly(ester-urea), poly(ether-urea), poly(ester-urethane), or poly(ether-urethane), or a mixture thereof. For convenience and unless stated otherwise, oligomers or polymers comprising the MSA materials may simply be referred to herein as polymers, which includes homopolymers and interpolymers such as co-polymers, terpolymers, etc.

In some embodiments, the MSA materials include "non-aromatic hydrocarbylene groups" and this term means specifically herein hydrocarbylene groups (a divalent radical formed by removing two hydrogen atoms from a hydrocarbon) not having or including any aromatic structures such as aromatic rings (e.g. phenyl) in the backbone of the oligomer or polymer repeating units. In some embodiments, non-aromatic hydrocarbylene groups are optionally substituted with various substituents, or functional groups, including but not limited to: halides, alkoxy groups, hydroxy groups, thiol groups, ester groups, ketone groups, carboxylic acid groups, amines, and amides. A "non-aromatic heterohydrocarbylene" is a hydrocarbylene that includes at least one non-carbon atom (e.g. N, O, S, P or other heteroatom) in the backbone of the polymer or oligomer chain, and that does not have or include aromatic structures (e.g., aromatic rings) in the backbone of the polymer or oligomer chain. In some embodiments, non-aromatic heterohydrocarbylene groups are optionally substituted with various substituents, or functional groups, including but not limited to: halides, alkoxy groups, hydroxy groups, thiol groups, ester groups, ketone groups, carboxylic acid groups, amines, and amides. Heteroalkylene is an alkylene group having at least one non-carbon atom (e.g. N, O, S or other heteroatom) that, in some embodiments, is optionally substituted with various substituents, or functional groups, including but not limited to: halides, alkoxy groups, hydroxy groups, thiol groups, ester groups, ketone groups, carboxylic acid groups, amines, and amides. For the purpose of this disclosure, a "cycloalkyl" group is a saturated carbocyclic radical having three to twelve carbon atoms, preferably three to seven. A "cycloalkylene" group is an unsaturated carbocyclic radical having three to twelve carbon atoms, preferably three to seven. Cycloalkyl and cycloalkylene groups independently are monocyclic or polycyclic fused systems as long as no aromatics are included. Examples of carbocyclic radicals include cyclopropyl, cyclobutyl, cyclopentyl, cyclohexyl and cycloheptyl. In some embodiments, the groups herein are optionally substituted in one or more substitutable positions as would be known in the art. For example in some embodiments, cycloalkyl and cycloalkylene groups are optionally substituted with, among others, halides, alkoxy groups, hydroxy groups, thiol groups, ester groups, ketone groups, carboxylic acid groups, amines, and amides. In some embodiments, cycloalkyl and cycloalkene groups are optionally incorporated into combinations with other groups to form additional substituent groups, for example: "-Alkylene-cycloalkylene-", "-alkylene-cycloalkylene-alkylene-", "-heteroalkylene-cycloalkylene-", and "-heteroalkylene-cycloalkyl-heteroalkylene" which refer to various non-limiting combinations of alkyl, heteroalkyl, and cycloalkyl. These combinations include groups such as oxydialkylenes (e.g., diethylene glycol), groups derived from branched diols such as neopentyl glycol or derived from cyclo-hydrocarbylene diols such as Dow Chemical's UNOXOL® isomer mixture of 1,3- and 1,4-cyclohexanedimethanol, and other non-limiting groups, such -methylcylohexyl-, -methyl-cyclohexyl-methyl-, and the like. "Heterocycloalkyl" is one or more cyclic ring systems having 4 to 12 atoms and, containing carbon atoms and at least one and up to four heteroatoms selected from nitrogen, oxygen, or sulfur. Heterocycloalkyl includes fused ring structures. Preferred heterocyclic groups contain two ring nitrogen atoms, such as piperazinyl. In some embodiments, the heterocycloalkyl groups herein are optionally substituted in one or more substitutable positions. For example in some embodiments, heterocycloalkyl groups are optionally substituted with halides, alkoxy groups, hydroxy groups, thiol groups, ester groups, ketone groups, carboxylic acid groups, amines, and amides.

Examples of MSA materials useful in the present invention are poly(ester-amides), poly(ether-amides), poly(ester-ureas), poly(ether-ureas), poly(ester-urethanes), and poly (ether-urethanes), and mixtures thereof that are described, with preparations thereof, in U.S. Pat. No. 6,172,167; and applicant's co-pending PCT application numbers PCT/US2006/023450, which was renumbered as PCT/US2006/004005 and published under PCT International Patent Application Number (PCT-IPAPN) WO 2007/099397 and U.S. Patent Application Publication Number (USPAPN) 2008-0214743; PCT/US2006/035201, which published under PCT-IPAPN WO 2007/030791; PCT/US08/053917, which published under PCT-IPAPN WO 2008/101051; PCT/US08/056754, which published under PCT-IPAPN WO 2008/112833; and PCT/US08/065242. Preferred said MSA materials are described below.

In a set of preferred embodiments, the molecularly self-assembling material comprises ester repeat units of Formula I:

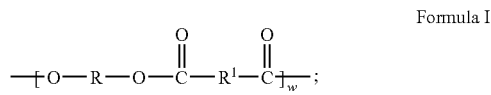

Formula I and at least one second repeat unit selected from the esteramide units of Formula II and III:

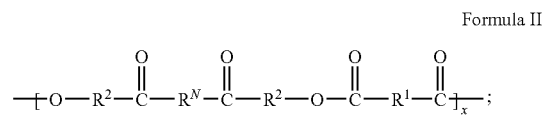

Formula II

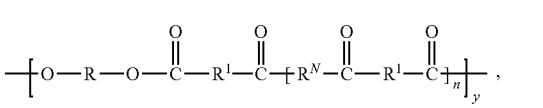

Formula III and the ester-urethane units of Formula IV:

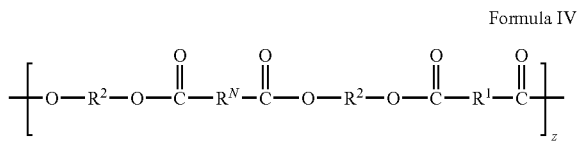

Formula IV wherein

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 to about 5000 g/mol. In preferred embodiments, the $C_2$-$C_{20}$ non-aromatic hydrocarbylene at each occurrence is independently specific groups: alkylene-, -cycloalkylene-, -alkylene-cycloalkylene-, -alkylene-cycloalkylene-alkylene-(including dimethylene cyclohexyl groups). Preferably, these aforementioned specific groups are from 2 to 12 carbon atoms, more preferably from 3 to 7 carbon atoms. The $C_2$-$C_{20}$ non-aromatic heterohydrocarbylene groups are at each occurrence, independently specifically groups, non-limiting examples including: -hetereoalkylene-, -heteroalkylene-cycloalkylene-, -cycloalkylene-heteroalkylene-, or -heteroalkylene-cycloalkylene-heteroalkylene-, each aforementioned specific group preferably comprising from 2 to 12 carbon atoms, more preferably from 3 to 7 carbon atoms. Preferred heteroalkylene groups include oxydialkylenes, for example diethylene glycol (—$CH_2CH_2OCH_2CH_2$—O—). When R is a polyalkylene oxide group it preferably is a polytetramethylene ether, polypropylene oxide, polyethylene oxide, or their combinations in random or block configuration wherein the molecular weight (Mn-average molecular weight, or conventional molecular weight) is preferably about 250 g/ml to 5000, g/mol, more preferably more than 280 g/mol, and still more preferably more than 500 g/mol, and is preferably less than 3000 g/mol; in some embodiments, mixed length alkylene oxides are included. Other preferred embodiments include species where R is the same $C_2$-$C_6$ alkylene group at each occurrence, and most preferably it is —$(CH_2)_4$—.

$R^1$ is at each occurrence, independently, a bond, or a $C_1$-$C_{20}$ non-aromatic hydrocarbylene group. In some preferred embodiments, $R^1$ is the same $C_1$-$C_6$ alkylene group at each occurrence, most preferably —$(CH_2)_4$—.

$R^2$ is at each occurrence, independently, a $C_1$-$C_{20}$ non-aromatic hydrocarbylene group. According to another embodiment, $R^2$ is the same at each occurrence, preferably $C_1$-$C_6$ alkylene, and even more preferably $R^2$ is —$(CH_2)_2$—, —$(CH_2)_3$—, —$(CH_2)_4$—, or —$(CH_2)_5$—.

$R^N$ is at each occurrence —$N(R^3)$—Ra—$N(R^3)$—, where $R^3$ is independently H or a $C_1$-$C_6$ alkyl, preferably $C_1$-$C_4$ alkyl, or $R^N$ is a $C_2$-$C_{20}$ heterocycloalkylene group containing the two nitrogen atoms, wherein each nitrogen atom is bonded to a carbonyl group according to Formula II or III above; w represents the ester mol fraction, and x, y and z represent the amide or urethane mole fractions where w+x+y+z=1, 0<w<1, and at least one of x, y and z is greater than zero. Ra is a $C_2$-$C_{20}$ non-aromatic hydrocarbylene group, more preferably a $C_2$-$C_{12}$ alkylene: most preferred Ra groups are ethylene butylene, and hexylene —$(CH_2)_6$—. In some embodiments, $R^N$ is piperazin-1,4-diyl. According to another embodiment, both $R^3$ groups are hydrogen.

n is at least 1 and has a mean value less than 2.

In an alternative embodiment, the MSA is a polymer consisting of repeat units of either Formula II or Formula III, wherein R, $R^1$, $R^2$, $R^N$, and n are as defined above and x and y are mole fractions wherein x+y=1, and $0 \leq x \leq 1$ and $0 \leq y \leq 1$.

In certain embodiments comprising polyesteramides of Formula I and II, or Formula I, II, and III, particularly preferred materials are those wherein R is —$(C_2$-$C_6)$-alkylene, especially —$(CH_2)_4$—. Also preferred are materials wherein $R^1$ at each occurrence is the same and is $C_1$-$C_6$ alkylene, especially —$(CH_2)_4$—. Further preferred are materials wherein $R^2$ at each occurrence is the same and is —$(C_1$-$C_6)$-alkylene, especially —$(CH_2)_5$-alkylene. The polyesteramide according to this embodiment preferably has a number average molecular weight (Mn) of at least about 4000, and no more than about 20,000. More preferably, the molecular weight is no more than about 12,000.

For convenience the chemical repeat units for various embodiments are shown independently. The invention encompasses all possible distributions of the w, x, y, and z units in the copolymers, including randomly distributed w, x, y and z units, altenatingly distributed w, x, y and z units, as well as partially, and block or segmented copolymers, the definition of these kinds of copolymers being used in the conventional manner as known in the art. Additionally, there are no particular limitations in the invention on the fraction of the various units, provided that the copolymer contains at least one w and at least one x, y, or z unit. In some embodiments, the mole fraction of w to (x+y+z) units is between about 0.1:0.9 and about 0.9:0.1. In some preferred embodiments, the copolymer comprises at least 15 mole percent w units, at least 25 mole percent w units, or at least 50 mole percent w units In some embodiments, the number average molecular weight ($M_n$) of the MSA material useful in the present invention is between 1000 g/mol and 30,000 g/mol, inclusive. In some embodiments, $M_n$ of the MSA material is between 2,000 g/mol and 20,000 g/mol, inclusive, preferably 5,000 g/mol to 12,000 g/mol. In more preferred embodiments, $M_n$ of the MSA material is less than 5,000 g/mol. Thus, in some more preferred embodiments, $M_n$ of the MSA material is at least about 1000 g/mol and 4,900 g/mol or less, more preferably 4,500 g/mol or less.

Viscosity of a melt of a preferred MSA material is characterized as being Newtonian over the frequency range of $10^{-1}$ to $10^2$ radians per second (rad/s.) at a temperature from above a melting temperature $T_m$ up to about 40 degrees Celsius (° C.) above $T_m$, preferably as determined by differential scanning calorimetry (DSC). Depending upon the polymer or oligomer, preferred MSA materials exhibit Newtonian viscosity in the test range frequency at temperatures above 100° C., more preferably above 120° C. and more preferably still at or above 140° C. and preferably less than 300° C., more preferably less than 250° C. and more preferably still less than 200° C. For the purposes of the present disclosure, the term Newtonian has its conventional meaning; that is, approximately a constant viscosity with increasing (or decreasing) shear rate of a (MSA) material at a constant testing temperature. The zero shear viscosity of a preferred MSA material is in the range of from 0.1 Pa·s. to 1000 Pa·s., preferably from 0.1 Pa·s. to 100 Pa·s., more preferably from 0.1 to 30 Pa·s., still more preferred 0.1 Pa·s. to 10 Pa·s., between the temperature range of 180° C. and 220° C., e.g., 180° C. and 190° C.

Preferably, the viscosity of a melt of a MSA material useful in the present invention is less than 100 Pa·s. at from above $T_m$ up to about 40° C. above $T_m$. The viscosity of one of the preferred MSA materials is less than 100 Pa·s. at 190° C., and more preferably in the range of from 1 Pa·s. to 50 Pa·s. at 150° C. to 170° C. Preferably, the glass transition temperature of the MSA material is less than 20° C. Preferably, the melting temperature is higher than 60° C. Preferred MSA materials exhibit multiple glass transition temperatures $T_g$. Preferably, the MSA material has a $T_g$ that is higher than −80° C. Also preferably, the MSA material has a $T_g$ that is higher than −60° C.

Tensile modulus of one preferred group of MSA materials is preferably from 4 megapascals (MPa) to 500 MPa at room temperature, preferably 20° C. Tensile modulus testing is well known in the polymer arts.

Preferably, torsional (dynamic) storage modulus of MSA materials useful in the invention is at least 100 MPa at 20° C. More preferably, the storage modulus is at least 200 MPa, still more preferably at least 300 MPa, and even more preferably greater than 400 MPa, all at 20° C.

Preferably, polydispersities of substantially linear MSA materials useful in the present invention is 4 or less, more preferably 3 or less, still more preferably 2.5 or less, still more preferably 2.2 or less.

In some embodiments, the polymers described herein are modified with, for example and without limitation thereto, other polymers, resins, tackifiers, fillers, oils and additives (e.g. flame retardants, antioxidants, pigments, dyes, and the like).

The Invention Polymer Organoclay Composite

Preferably, the organoclays comprise a total of at least 1 wt %, more preferably at least 10 wt %, and still more preferably at least 30 wt % of the polymer organoclay composite of the first embodiment based on total weight of the polymer organoclay composite. Also preferably, the organoclays comprise a total of about 60 wt % or less, and more preferably about 50 wt % or less of the polymer organoclay composite of the first embodiment based on total weight of the polymer organoclay composite.

In some embodiments, the cation exchanging capacity of the organoclay is from greater than 0 mol % to 100 mol % exchanged with the organic cations and the polymer organoclay composite of the first embodiment further comprises an organic cation material. In other embodiments, the polymer organoclay composite of the first embodiment does not further comprise the organic cation material.

In some embodiments, the organoclay is essentially not exfoliated such that less than 2 percent, more preferably less than 1 percent, and still more preferably less than 0.2 percent of particles of the organoclay have at least one dimension that is less than 100 nanometers (nm). In other embodiments, at least some of the organoclay is exfoliated. More preferably the organoclay is substantially exfoliated such that at least 50 percent of particles of the organoclay has at least one dimension that is less than 100 nm.

A preferred polymer organoclay composite of the first embodiment is characterized, when its MSA material is a melt, as having a zero shear viscosity of less than 10,000,000 Pa·s., more preferably 1,000,000 Pa·s. or less, still more preferably 1000 Pa·s. or less, and even more preferably 500 Pa·s. or less at from above $T_m$ up to about 40° C. above $T_m$ of the MSA material, preferably from 150° C. to 180° C.

Another preferred polymer organoclay composite is characterized as having a storage modulus (G') compared to G' of the MSA material alone (i.e., unfilled), of 1.1 times or higher, more preferably 1.2 times or higher, still more preferably 2 times or higher, even more preferably 3 times or higher, and yet more preferably 5 times or higher, all storage moduluses being determined at 25° C. In some embodiments, G' of the polymer organoclay composite is 150 megaPascals (MPa) or higher than G' of the MSA material alone, all at 25° C. In other embodiments, G' of the polymer organoclay composite is 400 MPa or higher, more preferably 600 MPa or higher, and still more preferably 800 MPa or higher, all at 25° C. Storage modulus G' is measured by dynamic mechanical spectroscopy (DMS) according to the method described later.

In some embodiments, the polymer organoclay composite consists essentially of a MSA material and an organoclay (i.e., the organoclay lacks inorganic cations). In other embodiments, the polymer organoclay composite comprises the MSA material, an organoclay, and inorganic cations.

The Process of Making the Invention Polymer Organoclay Composite

In some embodiments, the MSA material and organoclay are exfoliatably contacted (e.g., compounded or blended under shear) at a temperature of 30° C. or higher and 350° C. or less, provided the temperature is above the MSA material's glass transition temperature ($T_g$) or melt temperature ($T_m$), whichever is higher. In some embodiments, the MSA material and organoclay are compounded at a pressure of 0.1 atmosphere (ATM) to 1000 ATM.

Preferably, temperature of the melt comprising the MSA material during the exfoliatably contacting with (dispersing of) organoclay therein is less than 250° C., more preferably less than 200° C., and still more preferably less than 180° C.

The relatively low temperature of the melt comprising the MSA material and relatively low shear stress during the exfoliatably contacting (e.g., mixing with delamination) of organoclay therein as compared to, for example, the temperature of, and shear stress during exfoliatably contacting, a comparator melt comprising a thermoplastic non-MSA polymer and the organoclay, is preferred for MSA materials having the zero shear viscosities described previously (e.g., preferably in the range of from 1 Pa·s. to 50 Pa·s. at 150° C. to 170° C.).

In some embodiments, the mixing step comprises exfoliatably contacting under exfoliating conditions and the organoclay, in the melt of the polymer organoclay composite, comprises particles and the organoclay is substantially exfoliated such that at least 50 percent of the particles of the organoclay have at least one dimension that is less than 100 nanometers. The phrase "melt of the polymer organoclay composite" means a mixture comprising the organoclay dispersed in a liquid form of the MSA material. Where the process of the second embodiment employs the solution comprising the MSA material and the solvent, in some embodiments the mixture further comprises the solvent, or a residual amount thereof. More preferably, the solvent substantially evaporates out of the mixture during, after, or during and after the mixing step, and the resulting polymer organoclay composite essentially lacks the solvent (i.e., contains less than 5 wt % solvent, and preferably less than 1 wt % solvent).

In some embodiments, the melt or solution comprising a MSA material comprises one MSA material. In other embodiments, the melt or solution comprises a mixture of two or more different MSA materials.

The Article Comprising the Polymer Organoclay Composite of the First Embodiment

In some embodiments, the article comprises packaging, blow molded, injection molded, or a roto-molded article, fibers, catalyst bed, thermal insulation, electrical insulation, or an electrical conductor. In other embodiments, the article comprises a bandage, medical gown, medical scaffold, cosmetic, sound insulation, barrier material, diaper coverstock, adult incontinence pants, training pants, underpad, feminine hygiene pad, wiping cloth, porous filter medium (e.g., for filtering air, gasses, or liquids), durable paper, fabric softener, home furnishing, floor covering backing, geotextile, apparel, apparel interfacing, apparel lining, shoe, industrial garment, protective garments and fabrics, agricultural fabric, automotive fabric, coating substrate, laminating substrate, leather, or electronic component.

The Process for Fabricating the Polymer Organoclay Composite Fiber of the Fourth Embodiment A typical melt spinning extrusion process for fabricating the polymer organoclay composite fiber is performed on a Werner & Pfleiderer ZSK-25-4 extruder. Parameters for operating the extruder for effective melt spinning extrusion of the polymer organoclay composite fiber may be readily determined by a person of ordinary skill in the art without undue experimentation. By way of example for a MSA material that is a polyesteramide-C2C50% of Preparation 1C (described later), the barrel zone (Z1 to Z10) temperature set points are chosen as from about 50° C. (Z1) to 110 (Z10)° C., die temperature of about 140° C. or higher (the die temperature typically exceeds $T_g$ or $T_m$, whichever is higher, of the MSA material), screw speed about 125 revolutions per minute (rpm). Adjust temperatures and screw speeds for melt viscosity of the particular MSA material being used. Use of commercially available plastic extruders such as manufactured by Werner & Pfleiderer, Battenfeld, Collin, Reifenhauser is more preferred.

In some embodiments, the mixture mentioned in the process of the fifth embodiment is prepared by a process comprising a step of: heating a polymer organoclay composite of the first embodiment. In other embodiments, the mixture is prepared by a process comprising a step of: mixing the organoclay with either a second melt of the MSA material or a solution comprising a solvent and the MSA material to produce the mixture. In some embodiments, the mixing step comprises exfoliatably contacting under exfoliating conditions the organoclay to either the second melt of the MSA material or the solution. Temperature of the second melt comprising the MSA material, temperature of the polymer organoclay composite of the first embodiment in the heating step, and temperature of the first melt comprising the MSA material in the mixture in the melt spin extruding step independently are the same or different.

Materials and Methods

Materials

CLOISITE™ 30B (Southern Clay Products, Inc.) is a natural montmorillonite-derived organoclay having CAS No. 341537-63-1 and having a CEC of 90 mEQ per 100 grams and an organic cation comprising methyl,tallow,bis-(2-hydroxyethyl) quaternary ammonium. CLOISITE™ 30B is commercially obtained from Southern Clay Products, Inc., Gonzales, Tex., USA.

SOMASIF MEE-100 is a synthetic fluoromica-derived organoclay having a CEC 115 mEQ per 100 grams and 28.5 wt % of an organic cation comprising methyl,bis-(2-hydroxyethyl) cocamidopropyl betaine (coco betaine) quaternary ammonium. SOMASIF MEE-100 is commercially obtained from Co-op Chemicals, Japan.

Procedure for Determining Number Average Molecular Weight ($M_n$) of a MSA Material by Nuclear Magnetic Resonance Spectroscopy Proton nuclear magnetic resonance spectroscopy (proton NMR or $^1$H-NMR) is used to determine monomer purity, copolymer composition, and copolymer number average molecular weight $M_n$ utilizing the $CH_2OH$ end groups. Proton NMR assignments are dependent on the specific structure being analyzed as well as the solvent, concentration, and temperatures utilized for measurement. For ester amide monomers and co-polyesteramides, d4-acetic acid is a convenient solvent and is the solvent used unless otherwise noted. For ester amide monomers of the type called DD that are methyl esters typical peak assignments are about 3.6 to 3.7 ppm for $C(=O)$—$OCH_3$; about 3.2 to 3.3 ppm for N—$CH_2$—; about 2.2 to 2.4 ppm for $C(=O)$—$CH_2$—; and about 1.2 to 1.7 ppm for C—$CH_2$—C. For co-polyesteramides that are based on DD with 1,4-butanediol, typical peak assignments are about 4.1 to 4.2 ppm for $C(=O)$—$OCH_2$—; about 3.2 to 3.4 ppm for N—$CH_2$—; about 2.2 to 2.5 ppm for $C(=O)$—$CH_2$—; about 1.2 to 1.8 ppm for C—$CH_2$—C, and about 3.6 to 3.75 —$CH_2OH$ end groups.

Compounding Procedure for Preparing Polymer Organoclay Composites

Prior to compounding, all MSA materials and organoclays are pre-weighed and stored separately. In the following procedure, the MSA materials and organoclays are not dried before blending. A Haake PolyLab Rheocord blender (Haake) is outfitted with a 20 milliliter (mL) bowl. Temperatures of all zones of the Haake mixer are set to 160° C. An air cooling hose is attached to the central one of the zones in order to maintain temperature control. The MSA material is loaded into the 20 mL bowl and allowed to melt. Organoclays are added directly to the MSA material melt. Then, a plunger is lowered into the Haake, and the melt of the MSA material and organoclay is compounded at a rotor speed of 200 revolutions per minute (rpm), and a residence time of approximately 2.5 minutes. The residence time begins with the lowering of the plunger, and ends with the raising the plunger. Table 1 presents the timing for the compounding.

TABLE 1

Summary of composite compounding procedure

| Time | rpm | Comment |
|---|---|---|
| 0 second | 200 | |
| 10 seconds | 50 | Add MSA material |
| 1 minute 10 seconds | 200 | Allow MSA material to melt |
| 1 minute 30 seconds | 200 | Add organoclay or other fillers |

TABLE 1-continued

Summary of composite compounding procedure

| Time | rpm | Comment |
|---|---|---|
| 2 minutes 30 seconds | 200 | Compound to give composite |
| 5 minutes | 0 | Recover composite |

Compression Molding Procedure

Prior to molding, all samples are allowed to dry overnight (at least 16 hours) at 65° C. in a vacuum of approximately 36 cm Hg (48 kiloPascals (kPa)). Samples are compression molded into 10 cm×10 cm×0.05 cm plaques and 5 cm×1.25 cm×0.32 cm bars using a MPT-14 compression/lamination press (Tetrahedron Associates, Inc., San Diego, Calif., USA). The molding parameters for composites comprising the MSA materials of Preparations 1 and 2 are listed in Tables 2 and 3, respectively.

TABLE 2

Summary of compression molding parameters for composites comprising the MSA material of Preparation 1C

| Step | Temperature (° C.) | Temperature ramp rate (° C./minute) | Load, kg (klb) | Load ramp rate, kg/minute (klb/min) | Time (minutes) |
|---|---|---|---|---|---|
| 1 | 140 | 93 | 608 (1.5) | 317 × 10³ (1200) | 5 |
| 2 | 140 | 93 | 4536 (10) | 317 × 10³ (1200) | 4 |
| 3 | 140 | 93 | 18143 (40) | 317 × 10³ (1200) | 3 |
| 4 | 37.8 | 93 | 450 (1) | 317 × 10³ (1200) | 5 |
| 5 | End | | | | |

TABLE 3

Summary of compression molding parameters for composites comprising the MSA material of Preparation 2

| Step | Temperature (° C.) | Temperature ramp rate (° C./minute) | Load, kg (klb) | Load ramp rate, kg/minute (klb/min) | Time (minutes) |
|---|---|---|---|---|---|
| 1 | 93 | 93 | 2268 (5) | 317 × 10³ (1200) | 5 |
| 2 | 93 | 93 | 4536 (10) | 317 × 10³ (1200) | 10 |
| 3 | 93 | 93 | 2268 (5) | 317 × 10³ (1200) | 5 |
| 4 | 24 | 93 | 450 (1) | 317 × 10³ (1200) | 5 |
| 5 | End | | | | |

Thermogravimetric Analysis (TGA) Procedure

Samples weighing between 5 milligrams (mg) and 10 mg are loaded into an aluminum TGA pan and heated to 500° C. at a rate of 10° C./minute in a TA Instruments Q5000 TGA in a nitrogen gas atmosphere. TGA is used to determine actual concentration of inorganics in a composite. In order to compare the concentration results obtained with TGA to predicted concentrations of organoclays based on amounts of organoclays used in composite preparations, weights of the inorganic residue resulting from TGA must be divided by weight loss upon ignition for that clay. Plot results as weight percent (weight %) versus temperature (° C.), wherein weight percent means residual weight of a sample as a percent of original weight of the sample.

X-Ray Diffraction (XRD) Procedure

Samples, approximately 0.5 mm thick, are cut from the compression molded plaques and mounted on clay and characterized using a Bruker XRD equipped with an Cu K-alpha tube, operated at 40 milliamperes (mA) and 40 kilovolts (kV). To allow for low angle XRD, slits of 0.3 degrees divergence and 0.3 degrees antiscatter are used. The step size is 0.020 degrees 2-theta/theta at 1.0 second/step, and samples are scanned from 1.0 degrees 2-theta/theta to 65.0 degrees 2-theta/theta. Plot results as Intensity in arbitrary units (a.u.) versus three-dimensional real vector q in reciprical angstroms (1/Å).

Transmission Electron Microscope (TEM) Imaging Procedure

Samples, approximately 0.5 mm in thickness, are cut from the compression molded plaques and mounted in a chuck for ultracryomicrotomy. Cross-sectional to the thickness, the samples are trimmed into a trapezoid and cooled to −100° C. in the microtome. Thin-sections, approximately 80 nm are then obtained and examined in a JEOL 1230 TEM at 120 KeV. Digital images of the microstructure are recorded at various magnifications (typically 50,000 times magnification) using a Gatan Multiscan 794 camera. Show magnified TEM images as black-and-white photographs.

Dynamic Mechanical Spectroscopy (DMS) Procedure

Prior to conducting DMS experiments, all samples are exposed to laboratory atmosphere for at least 40 hours to allow for sample equilibration to the test environment. Samples are in the form of the 5 cm×1.25 cm×0.32 cm compression molded bars, which are loaded into torsional rectangular holders of an Ares Rheometer from TA Instruments. Initially, a dynamic strain sweep is conducted at 1 Hz and 25° C. beginning at a strain of 0.001%. For each sample a strain value is obtained from a region where storage modulus (G') is linear over a range of strain values. This strain value is used for subsequent dynamic frequency sweeps and dynamic temperature ramps. Using the strain value obtained during the strain sweep, a frequency sweep is conducted at 25° C. The frequency ranged from 100 radians per second (rad/s.) to 0.01 rad/s. Finally, a temperature ramp is conducted from −80° C. to 100° C. at a heating rate of 5° C./minute. The frequency is held constant at 1 Hz. Plot results as storage modulus, G', in Pascals (Pa) versus temperature (° C.).

Water Vapor and Oxygen Gas Permeation Testing Procedures

Oxygen gas ($O_2$) transport: $O_2$ transport across pure MSA material and invention nanocomposite samples are conducted on a Mocon Ox-Tran® 2/21 oxygen transmission rate testing instrument (MOCON, Inc., Minneapolis, Minn., USA). A sample is a 10 cm×10 cm×0.05 cm compression molded plaque, which has spaced-apart entrance and exit faces that, when used in the Mocon Ox-Tran® 2/21, lack fluid communication with each other except through the plaque. Temperature of the Mocon Ox-Tran® 2/21 is set to 23° C. and barometric pressure is about 750 mmHg (100 kiloPascals (kPa)). The testing procedure employs the hydrous gas mixture (feed gas) and a carrier gas (2 mol % hydrogen in nitrogen), which transports downstream permeant gas away from the exit face of the plaque. Relative humidity of the hydrous gas and the carrier gas is about 50% each. The downstream permeant gas comprises oxygen that has moved through the plaque. Oxygen permeability is reported in terms of the cubic centimeters (cc) of oxygen at standard pressure and temperature that can pass through a plaque that is 1 mil (0.001 inch, 0.0254 millimeter) thick and 100 square inches ($in^2$) in surface area in 1 day (cc mil/100 $in^2$/day), where standard temperature and pressure are 25° C. and 1 atmosphere (101 kPa).

Water vapor transport: samples previously tested in the $O_2$ transport experiments are transferred to a Mocon Permatran-W® 700 moisture vapor transmission rate testing instrument (MOCON, Inc.) comprising a water sensor. Water vapor transport experiments are conducted at about 38° C., 760 mmHg barometric pressure, and 100% relative humidity. A carrier gas is 100% dry (i.e., anhydrous) nitrogen gas and the hydrous gas mixture (i.e., test gas) comprises water vapor in air. The hydrous gas mixture is generated from a wet sponge disposed near the entrance face of the plaque. The carrier gas sweeps any water vapor that has permeated through the plaque away from the exit face of the plaque to the sensor. Water vapor permeability is reported in terms of the grams of water vapor that can pass through and plaque that is 1 mil thick and 100 $in^2$ in surface area in 1 day (gm mil/100 $in^2$/day).

Melt Viscosity Measurement Procedure

Samples are die cut from a plaque of composite. Parallel plate geometry holders in an Ares Rheometer (TA Instruments) are heated to 170° C. The holders are zeroed at temperature. A sample is loaded onto the holders, and the top holder is lowered into that sample so that there is significant normal force on the sample. The sample is allowed to melt, and any melted sample that extends beyond the holders is removed. Initially, a dynamic strain sweep is conducted at 1 Hz and 170° C. beginning at a strain of 0.1%. For each sample, a strain value is obtained from a region where loss modulus (G") is linear over a range of strain values. This strain value is used for subsequent dynamic frequency sweeps. Using the strain value obtained during the strain sweep, a frequency sweep is conducted at 170° C. The frequency ranged from 100 rad/s. to 0.1 rad/s.

Preparations

Preparations 1A, 1B, and 1C: preparation of MSA material that is a polyesteramide (PEA) comprising 50 mole percent of ethylene-N,N'-dihydroxyhexanamide (C2C) monomer (the MSA material is generally designated as a PEA-C2C50%)

Step (a) Preparation of the Diamide Diol, ethylene-N,N'-dihydroxyhexanamide (C2C) Monomer The C2C diamide diol monomer is prepared by reacting 1.2 kg ethylene diamine (EDA) with 4.56 kilograms (kg) of ε-caprolactone under a nitrogen blanket in a stainless steel reactor equipped with an agitator and a cooling water jacket. An exothermic condensation reaction between the ε-caprolactone and the EDA occurs which causes the temperature to rise gradually to 80 degrees Celsius (° C.). A white deposit forms and the reactor contents solidify, at which the stirring is stopped. The reactor contents are then cooled to 20° C. and are then allowed to rest for 15 hours. The reactor contents are then heated to 140° C. at which temperature the solidified reactor contents melt. The liquid product is then discharged from the reactor into a collecting tray. A nuclear magnetic resonance study of the resulting product shows that the molar concentration of C2C diamide diol in the product exceeds 80 percent. The melting temperature of the C2C diamide diol monomer product is 140° C.

Step (b): Contacting C2C with Dimethyl Adipate (DMA)

A 100 liter single shaft Kneader-Devolatizer reactor equipped with a distillation column and a vacuum pump system is nitrogen purged, and heated under nitrogen atmosphere to 80° C. (based on thermostat). Dimethyl adipate (DMA; 38.324 kg) and C2C diamide diol monomer (31.724 kg) are fed into the kneader. The slurry is stirred at 50 revolutions per minute (rpm).

Step (c): Contacting C2C/DMA with 1,4-butanediol, Distilling Methanol and Transesterification 1,4-Butanediol (18.436 kg) is added to the slurry of Step (b) at a temperature of about 60° C. The reactor temperature is further increased to 145° C. to obtain a homogeneous solution. Still under nitrogen atmosphere, a solution of titanium(IV)butoxide (153 g) in 1.380 kg 1,4-butanediol is injected at a temperature of 145° C. into the reactor, and methanol evolution starts. The temperature in the reactor is slowly increased to 180° C. over 1.75 hours, and is held for 45 additional minutes to complete distillation of methanol at ambient pressure. 12.664 kilograms of methanol are collected.

Step (d): Distilling 1,4-butanediol and Polycondensation to Give PEA-C2C50%

Reactor dome temperature is increased to 130° C. and the vacuum system activated stepwise to a reactor pressure of 7 mbar (0.7 kiloPascals (kPa)) in 1 hour. Temperature in the kneader/devolatizer reactor is kept at 180° C. Then the vacuum is increased to 0.7 mbar (0.07 kPa) for 7 hours while the temperature is increased to 190° C. The reactor is kept for 3 additional hours at 191° C. and with vacuum ranging from 0.87 to 0.75 mbar. At this point a sample of the reactor contents is taken (Preparation 1A); melt viscosities were 6575 megaPascals (MPa) at 180° C. and 5300 MPa at 190° C. The reaction is continued for another 1.5 hours until the final melt viscosities are recorded as 8400 MPa at 180° C. and 6575 MPa at 190° C. (Preparation 1B). Then the liquid Kneader/Devolatizer reactor contents are discharged at high temperature of about 190° C. into collecting trays, the polymer is cooled to room temperature and grinded. Final product is 57.95 kg (87.8% yield) of melt viscosities 8625 MPa at 180° C. and 6725 MPa at 190° C. (Preparation 1C). Preparations 1A to 1C have the data shown below in Table 4.

TABLE 4

Melt viscosities and molecular weights of samples of MSA Copolyesteramide

| Hours in full vacuum* | Preparation Number | Spindle No. 28** (rpm) | Viscosity at 180° C. (MPa) | Viscosity at 190° C. (MPa) | $M_n$ by 1H-NMR (g/mol) |
|---|---|---|---|---|---|
| 10 | 1A | 20 | 6575 | 5300 | 6450 |
| 11.5 | 1B | 20 | 8400 | 6575 | 6900 |
| 11.5 | 1C | 20 | 8625 | 6725 | 7200 |

*Vacuum < 1.2 mbar
**Viscometer used: Brookfield DV-II+ Viscometer ™

Preparation 2: Preparation of MSA Material that is a Polyesteramide (PEA) Comprising 18 Mole Percent of ethylene-N,N'-dihydroxyhexanamide (C2C) Monomer (the MSA Material is Generally Designated as a PEA-C2C18%)

Into a 1-neck 500 mL round bottom flask is loaded titanium (IV) butoxide (0.31 g, 0.91 mmol), N,N'-1,2-ethanediyl-bis [6-hydroxyhexanamide] (C2C, 30.80 g, 0.1068 mol), dimethyl adipate (103.37 g, 0.5934 mol), and 1,4-butanediol (97.33 g, 1.080 mol). A stir-shaft and blade are inserted into the flask along with a modified Claisen adaptor with Vigreux column and distillation head. Apparatus is completed with stir bearing, stir motor, thermometer, take-off adaptor, receiver, heat-tracing and insulation, vacuum pump, vacuum regulator, nitrogen feed, and temperature controlled bath. Apparatus is degassed and held under positive nitrogen. Flask is immersed into a 160° C. bath with temperature raised to 175° C. for a total of 2 hours. Receiver is changed and vacuum is applied according to the following schedule: 5 minutes, 450 Torr (60 kiloPascals (kPa)); 5 minutes, 100 Torr; 5 minutes, 50 Torr; 5 minutes, 40 Torr; 10 minutes, 30 Torr; 10 minutes, 20 Torr; 1.5 hours, 10 Torr. Apparatus is placed under nitrogen, receiver changed, and placed under vacuum ranging over about 0.36 to about 0.46 Torr with the following schedule: 2 hours, 175° C.; 2 hours, to/at 190° C., and 3 hours to/at 210° C. Inherent viscosity=0.32 dL/g (methanol: chloroform (1:1 w/w), 30.0° C., 0.5 g/dL). By proton NMR in d4-acetic acid, $M_n$ from end groups is 11,700 g/mol and 17.3 mole % of polymer repeat units contain C2C.

COMPARATIVE EXAMPLES

Comparative Example 1

Unfilled PEA-C2C50% of Preparation 1C

Figure 2:
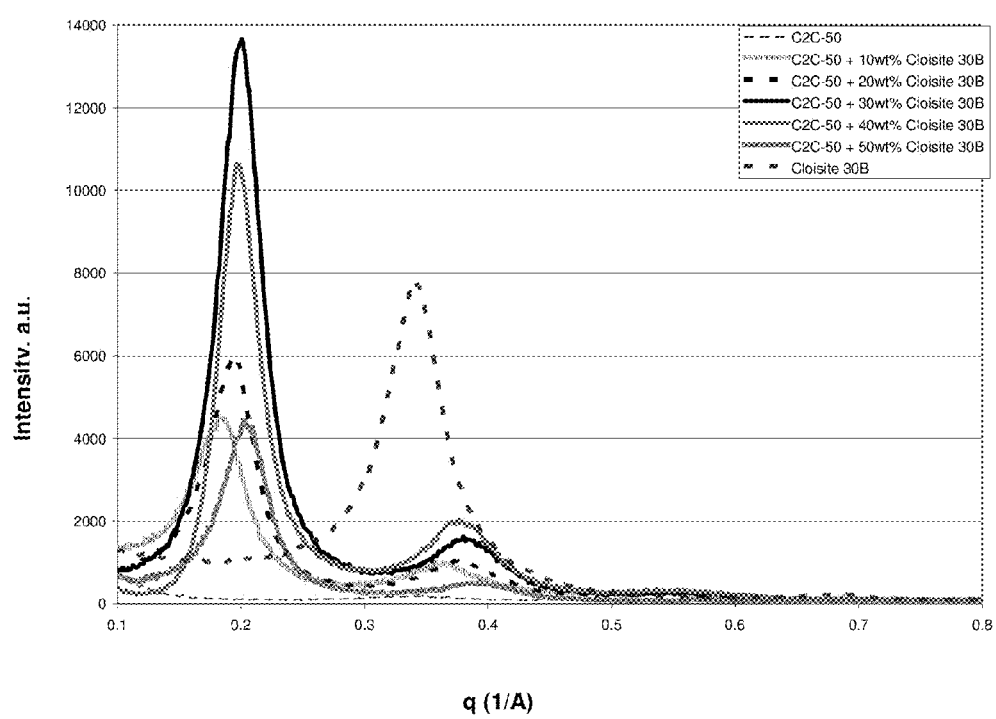
FIG. 2 graphically depicts X-ray diffraction (XRD) results for the MSA material of Comparative Example 1, the invention composites of Examples 3 to 7, and organoclay CLOISITE™ 30B (Southern Clay Products, Inc.).

Separate samples of the PEA-C2C50% of Preparation 1C are compression molded, prepared as plaques, and subjected to TGA, XRD, DMS, melt viscosity measurements, and tensile testing according to the procedures described above. TGA results are shown as parts of FIG. 1(a). XRD results are shown as parts of FIG. 2. DMS results are shown as part of FIG. 4. Melt viscosity results are shown as part of FIG. 8. In the figures, the unfilled PEA-C2C50% of Preparation 1C is referred to as "C2C-50," 0 wt % Organoclay, or "C2C-50 (unfilled)."

Comparative Example 2

Unfilled PEA-C2C18% of Preparation 2

Figure 1B:
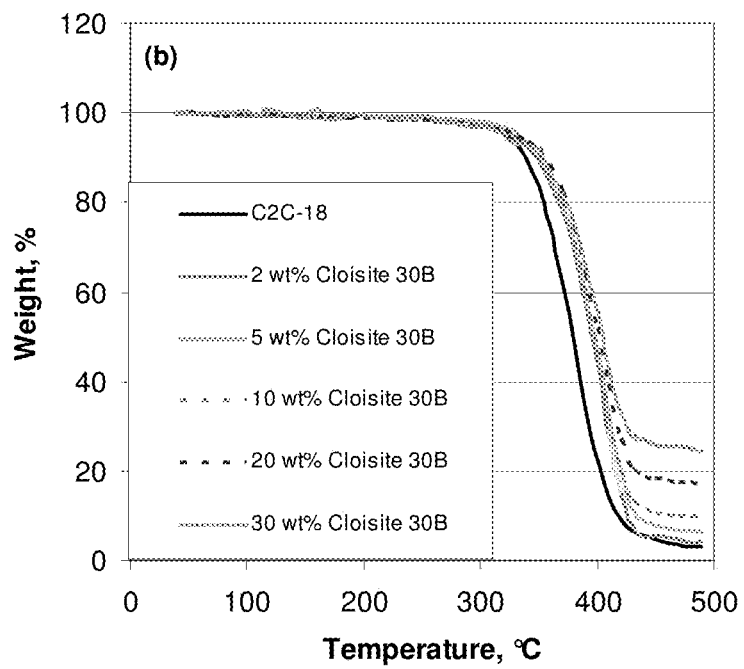
FIG. 1(b) graphically depicts TGA results for the MSA material of Comparative Example 2 and the invention composites of Examples 8 to 12.

Separate samples of the PEA-C2C18% of Preparation 2 are compression molded or prepared as plaques, and subjected to TGA measurements according to the procedures described above. TGA results are shown as part of FIG. 1(b). In FIG. 1(b), the plaque consisting of the PEA-C2C18% of Preparation 2 is referred to as "C2C-18."

In FIG. 10, the unfilled PEA-C2C18% of Preparation 2 is referred to as "C2C-18."

EXAMPLES OF THE PRESENT INVENTION

Examples 1 to 7

Composites Comprising the PEA-C2C50% of Preparation 1C and CLOISITE™ 30B

Separate weighed samples of the PEA-C2C50% of Preparation 1C are compounded with weighed amounts of CLOISITE™ 30B according to the compounding procedure for preparing polymer organoclay composites described above to give invention polymer organoclay composites respectively having 2 wt %, 5 wt %, 10 wt %, 20 wt %, 30 wt %, 40 wt %, or 50 wt % of the CLOISITE™ 30B as shown in Table 5.

TABLE 5

PEA-C2C50%/CLOISITE ™ 30B composites of Examples 1 to 7:

| | Example Number: | | | | | | |
|---|---|---|---|---|---|---|---|
| | 1 | 2 | 3 | 4 | 5 | 6 | 7 |
| Amount of CLOISITE ™ 30B (wt %) | 2 | 5 | 10 | 20 | 30 | 40 | 50 |

Figures 3A, 3B, 3C, 3D, 3E:
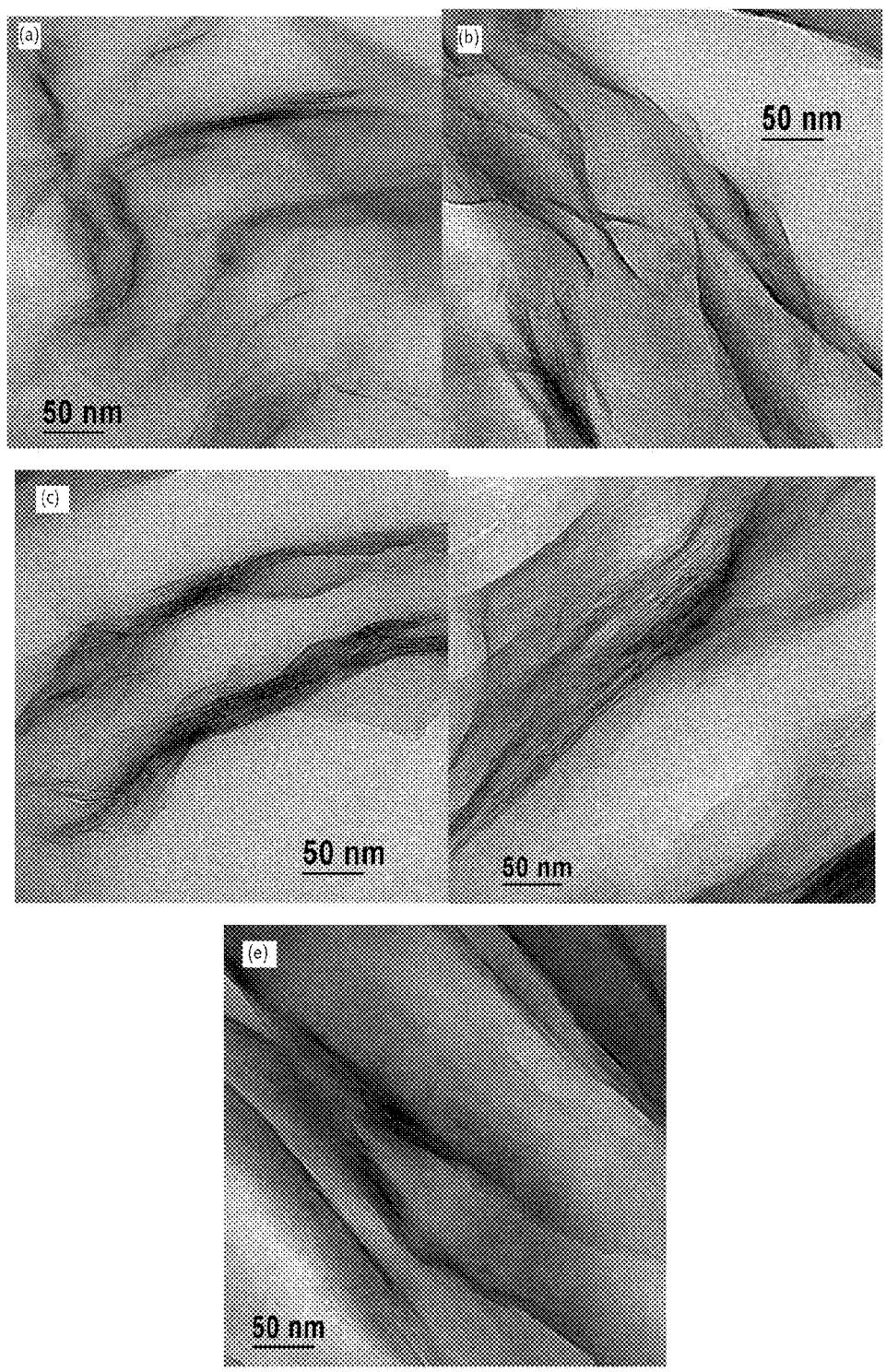
FIGS. 3(a) to 3(e) are transmission electron microscope (TEM) images at 50,000 times magnification of the invention composites of Examples 3 to 7.
Figure 5:
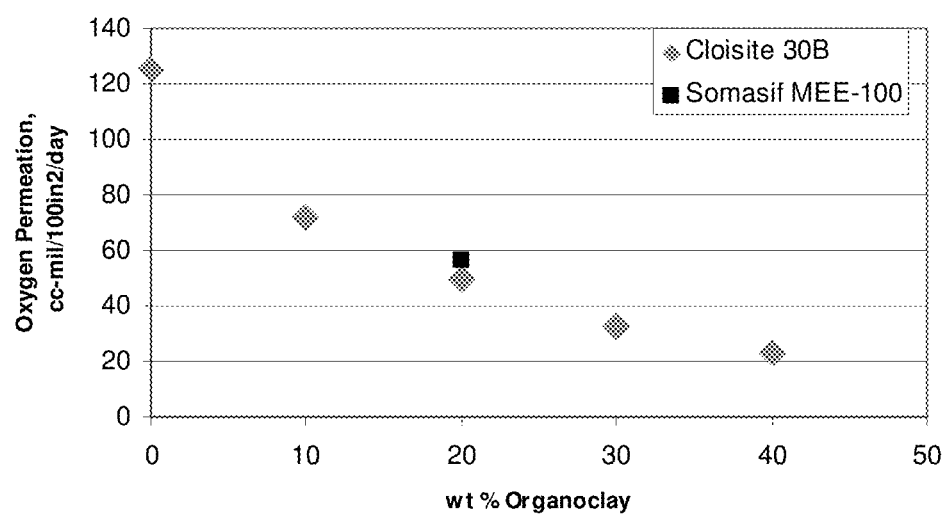
FIG. 5 graphically depicts oxygen permeation testing results for the MSA material of Comparative Example 1 and the invention composites of Examples 3 to 6 and 13.
Figure 6:
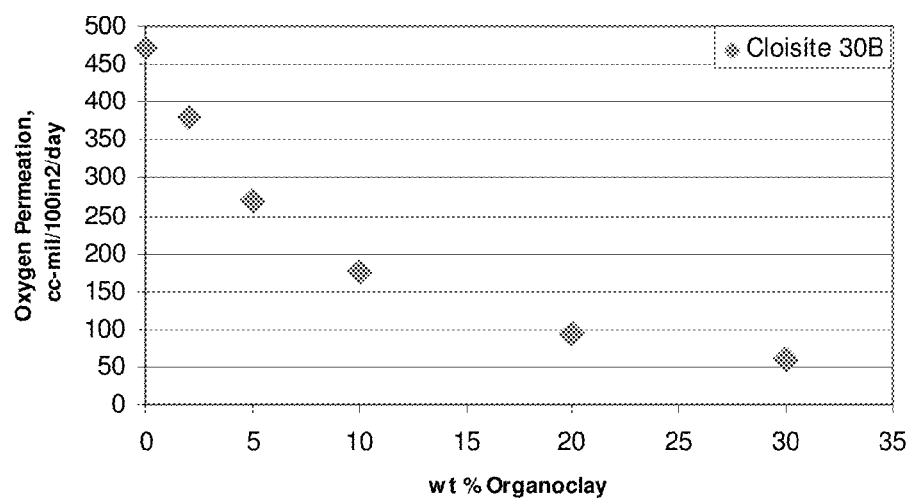
FIG. 6 graphically depicts oxygen permeation testing results for the MSA material of Comparative Example 2 and the invention composites of Examples 8 to 12.
Figure 7:
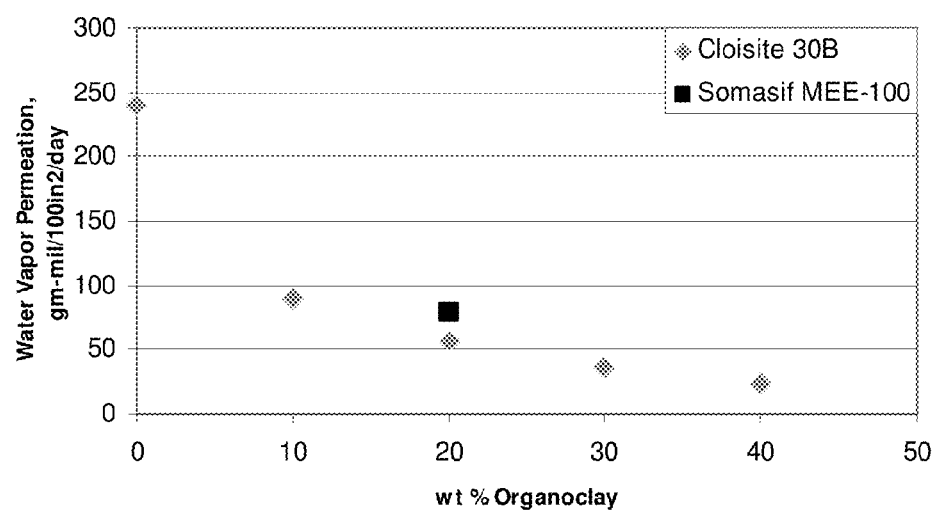
FIG. 7 graphically depicts water vapor permeation testing results for the MSA material of Comparative Example 1 and the invention composites of Examples 3 to 6 and 13.

Separate samples of the composites of Examples 1 to 7 are compression molded, prepared as plaques, and subjected to TGA, XRD, TEM imaging, DMS, oxygen and water vapor permeation testing, and melt viscosity measurements according to the procedures described above. TGA results are shown as parts of FIG. 1(*a*). The TGA results show that the amount of particle mixed into the plaque is actually present in the composites. XRD results are shown as parts of FIG. 2. The XRD results demonstrate that the particles are at least moderately exfoliated as can be observed by the shift of the major peak to a lower q value than what is observed for the neat particle (i.e., Cloisite 30B). TEM imaging results are shown in FIGS. 3(*a*) to 3(*e*), and these images show the dispersion of Cloisite 30B in MSA material. DMS results are shown as parts of FIG. 4. The DMS results demonstrate that G' increases with increasing particle loading. The G' value of the MSA containing 50 wt % Cloisite 30B is over 5 times higher than the G' value of unfilled MSA. Oxygen permeation testing results are shown in FIGS. 5 and 6. The oxygen permeability decreases with increasing Cloisite 30B concentration for composite based on C2C50% and C2C18%. These results are consistent for the MSA plaques filled with SOMASIF MEE-100. Water vapor permeation results are shown in FIG. 7. The water vapor permeability decreases with increasing Cloisite 30B concentration for composite based on C2C50%. These results are consistent for the MSA plaques filled with SOMASIF MEE-100. Melt viscosity results are shown as part of FIG. 8. These results demonstrate that the melt viscosity of the highly filled MSA is still below 10,000,000 Pa·S. Thus, the composites are still processable using many different types of melt processing equipment.

Figure 4:
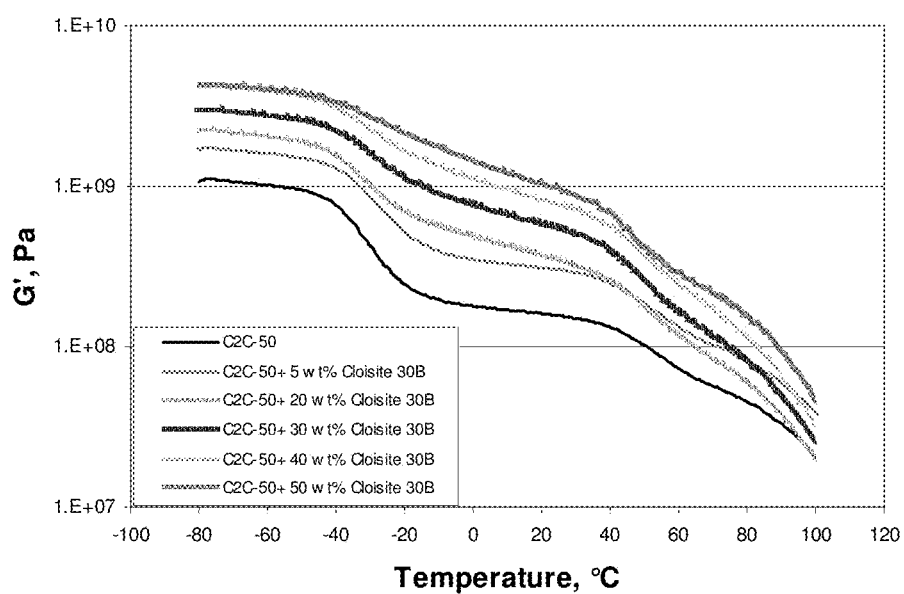
FIG. 4 graphically depicts dynamic mechanical spectroscopy (DMS) results for the MSA material of Comparative Example 1 and the invention composites of Examples 2 and 4 to 7.
Figure 8:
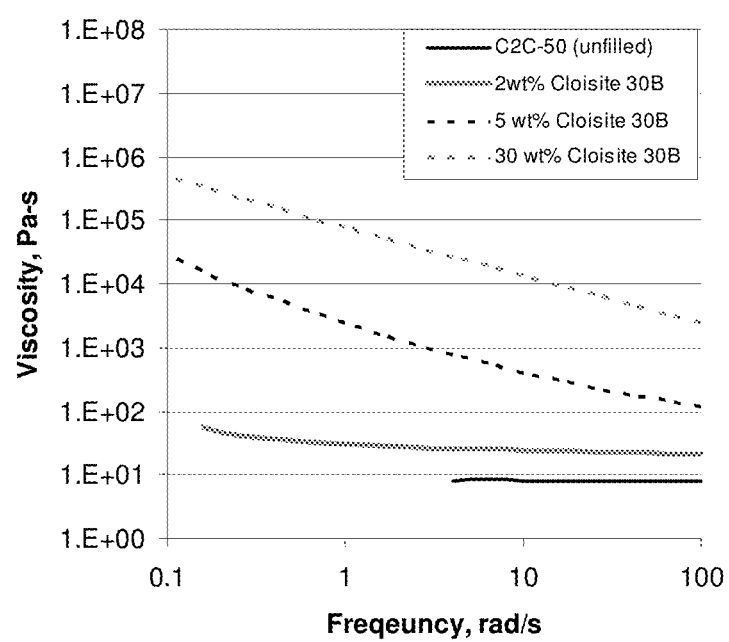
FIG. 8 graphically depicts melt viscosity results for the MSA material of Comparative Example 1 and the invention composites of Examples 1, 2, and 5.

In FIGS. 4 and 8, "1.E+07," for example, means 1 times 10 to the seventh power.

Examples 8 to 12

Composites Comprising the PEA-C2C18% of Preparation 2 and CLOISITE™ 30B

Separate weighed samples of the PEA-C2C18% of Preparation 2 are compounded with weighed amounts of CLOISITE™ 30B according to the compounding procedure for preparing polymer organoclay composites described above to give invention polymer organoclay composites respectively having 2 wt %, 5 wt %, 10 wt %, 20 wt %, or 30 wt % of the CLOISITE™ 30B as shown in Table 6.

TABLE 6

PEA-C2C18%/CLOISITE ™ 30B composites of Examples 8 to 12:

| | Example Number: | | | | |
|---|---|---|---|---|---|
| | 8 | 9 | 10 | 11 | 12 |
| Amount of CLOISITE ™ 30B (wt %) | 2 | 5 | 10 | 20 | 30 |

Separate samples of the composites of Examples 8 to 12 are compression molded, prepared as plaques, and subjected to TGA and oxygen permeation testing, and melt viscosity measurements according to the procedures described above. TGA results are shown as parts of FIG. 1(*b*). The TGA results show that the amount of particle mixed into the film is actually present in the composites. Oxygen permeation testing results are shown in FIG. 6. The oxygen permeability decreases with increasing Cloisite 30B concentration for composite based on C2C18%.

Example 13

Composite Comprising the PEA-C2C50% of Preparation 1C and SOMASIF ME-100

A weighed sample of the PEA-C2C50% of Preparation 1C is compounded with a weighed amount of SOMASIF ME-100 according to the compounding procedure for preparing polymer organoclay composites described above to give invention polymer organoclay composite having 20 wt % of the SOMASIF ME-100.

A sample of the composites of Example 13 is prepared as a plaque, and subjected to oxygen and water vapor permeation testing according to the procedures described above. The oxygen and water vapor permeation results are shown as parts of FIGS. 5 and 7, respectively. In FIGS. 5 and 7, the SOMASIF ME-100 composite of Example 13 is referred to by its weight percents of SOMASIF ME-100.

Example 14

Preparation of a Polymer Organoclay Composite Fiber Comprising the 30 wt % CLOISITE™ 30B Composite of Example 5

A sample of approximately 25 grams of the 30 wt % CLOISITE™ 30B composite of Example 5 is packed into a chamber of a Goettfert capillary rheometer (model Gottfert Rheograph 6000 (triple bore system)) having a die with a length of 30 millimeters (mm). The packed sample is allowed to heat to 160° C. Once 160° C. is reached, a rheometer piston moves at 2 mm per second and pushes the composite through a 0.5 millimeter (mm) die hole. The resulting polymer organoclay composite fiber is collected by hand.

While the invention has been described above according to its preferred embodiments of the present invention and examples of steps and elements thereof, it may be modified within the spirit and scope of this disclosure. This application is therefore intended to cover any variations, uses, or adaptations of the instant invention using the general principles disclosed herein. Further, this application is intended to cover such departures from the present disclosure as come within the known or customary practice in the art to which this invention pertains and which fall within the limits of the following claims.

What is claimed is:

1. A polymer organoclay composite comprising a molecularly self-assembling (MSA) material and an organoclay dispersed in the MSA material, wherein the organoclay comprises a cation exchanging layered material and organic cations, the cation exchanging layered material having a cation exchanging capacity that is at least 1 mole percent (mol %) exchanged with the organic cations, the organoclay comprising from 1 weight percent (wt %) to 70 wt % of the polymer organoclay composite based on total weight of the polymer organoclay composite wherein the molecularly self-assembling material comprises repeat units of formula I:

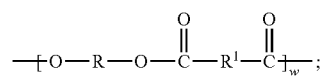

Formula I and at least one second repeat unit selected from the ester-amide units of Formula II and III:

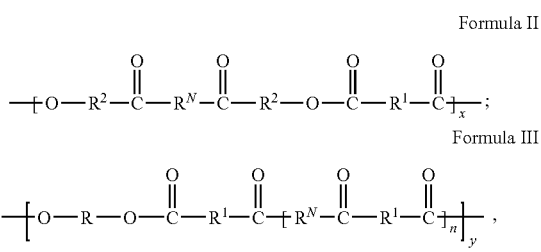

Formula II

Formula III and the ester-urethane units of Formula IV:

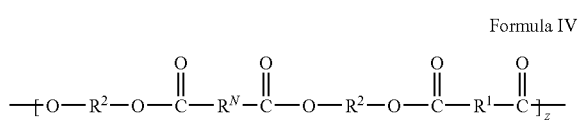

Formula IV or combinations thereof wherein:
R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 grams per mole to about 5000 grams per mole;
$R^1$ at each occurrence independently is a bond or a $C_1$-$C_{20}$ non-aromatic hydrocarbylene group;
$R^2$ at each occurrence independently is a $C_1$-$C_{20}$ non-aromatic hydrocarbylene group;
$R^N$ is —N($R^3$)—Ra—N($R^3$)—, where $R^3$ at each occurrence independently is H or a $C_1$-$C_6$ alkylene and Ra is a $C_2$-$C_{20}$ non-aromatic hydrocarbylene group, or $R^N$ is a $C_2$-$C_{20}$ heterocycloalkyl group containing the two nitrogen atoms, wherein each nitrogen atom is bonded to a carbonyl group according to formula (III) above;
n is at least 1 and has a mean value less than 2; and
w represents the ester mol fraction of Formula I, and x, y and z represent the amide or urethane mole fractions of Formulas II, III, and IV, respectively, where w+x+y+z=1, and 0<w≦1, and at least one of x, y and z is greater than zero but less than 1.

2. The polymer organoclay composite as in claim 1, wherein the organoclay comprises the cation exchanging layered material, organic cations, and inorganic cations, the cation exchanging layered material having a cation exchanging capacity that is less than 100 mol % exchanged with the organic cations.

3. The polymer organoclay composite as in claim 1, wherein the organoclay comprises particles and the organoclay is substantially exfoliated such that at least 50 percent of the particles of the organoclay have at least one dimension that is less than 100 nanometers.

4. The polymer organoclay composite as in claim 1, wherein when the MSA material is in a form of a melt, the polymer organoclay composite being characterized by a zero shear viscosity of less than 10,000,000 Pascal-seconds at from above $T_m$ up to about 40° C. above $T_m$ of the MSA material.

5. The polymer organoclay composite as in claim 1, the polymer organoclay composite being characterized by a storage modulus that is at least 2 times higher than a storage modulus of the MSA material alone, each storage modulus being determined at 25° C. and a frequency ranged from 100 radians per second to 0.01 radians per second.

6. The polymer organoclay composite as in claim 1, wherein the molecularly self-assembling material is a polyester-amide, polyether-amide, polyester-urethane, polyether-urethane, polyether-urea, polyester-urea, or a mixture thereof.

7. The polymer organoclay composite as in claim 1, wherein the MSA material comprises self-assembling units comprising multiple hydrogen bonding arrays.

8. The polymer organoclay composite as in claim 1, wherein the number average molecular weight (Mn) of the molecularly self-assembling material is between about 1000 grams per mole and about 50,000 grams per mole.

9. The polymer organoclay composite as in claim 1, wherein the MSA material itself is characterized by a melt viscosity of less than 100 pascal-seconds (Pa·sec.) at from above melting temperature ($T_m$) up to about 40 degrees Celsius (° C.) above $T_m$.

10. The polymer organoclay composite as in claim 1, wherein the MSA material itself is characterized by a melting temperature ($T_m$) greater than 60° C. or glass transition temperature ($T_g$) greater than −80° C.

11. A process for making a polymer organoclay composite, the process comprising the step of: mixing a desired amount of an organoclay in either a melt comprising a MSA material or a solution comprising a solvent and the MSA material to produce a melt of the polymer organoclay composite of claim 1.

12. The process as in claim 11, wherein the mixing step comprises exfoliatably contacting under exfoliating conditions and the organoclay, in the melt of the polymer organoclay composite, comprises particles and the organoclay is substantially exfoliated such that at least 50 percent of the particles of the organoclay have at least one dimension that is less than 100 nanometers.

13. An article comprising the polymer organoclay composite as in claim 1.

14. The article as in claim 13, wherein the article comprises a water barrier material or oxygen barrier material.

15. A polymer organoclay composite fiber comprising the polymer organoclay composite as in claim 1, the polymer organoclay composite fiber having an average diameter and the organoclay having at least one dimension that is less than 10% of the average diameter of polymer organoclay composite fiber.

16. A process for fabricating the polymer organoclay composite fiber of claim 15, the process comprising a step of: melt spin extruding a mixture comprising the organoclay and a first melt comprising the MSA material under fiber forming conditions to give the polymer organoclay composite fiber.

17. An article comprising the polymer organoclay composite fiber of claim 15.

18. The article as in claim 17, the article comprising a porous filter medium, wound dressing, textile, carpeting, structure reinforcing material, antistatic medium, conductive medium, catalyst medium, packaging, blow molded articles, thermal insulation, electrical insulation, or an electrical conductor.

* * * * *